Patented July 15, 1952

2,603,311

UNITED STATES PATENT OFFICE 2,603,311

DEHYDRATION OF GASES

Henry D. Frazier, Alhambra, and Fred C. Riesenfeld, Hollywood, Calif., assignors to The Fluor Corporation, Ltd., Los Angeles, Calif., a corporation of California No Drawing. Application May 11, 1948,
Serial No. 26,472

2 Claims. (Cl. 183—121)

This invention has to do generally with the dehydration of gases, e. g. natural or refinery gases, and relates particularly to improvements in methods of gas dehydration involving the use of polyhydric alcohols or glycols.

It is a common practice to dehydrate gases in a regeneration system according to which the glycol is intimately contacted with the gas in a contacting zone to absorb moisture from the gas, the resulting glycol solution being circulated through a heating zone or still to vaporize the absorbed water and concentrate the solution to an appropriae water content, e. g., around 5%. After cooling, the concentrated solution is returned to the contacting zone. As will be understood, there may be an exchange of heat from one to the other of the solutions flowing between the contacting and heating zones, in order that the system shall be thermally efficient.

One of our primary objects is to improve upon the conventional process as outlined, by bringing about a substantial reduction of the viscosity of the glycol absorbent, and in so doing, accomplish various advantages with respect to the efficiency of the system. In referring to reduction of the solution viscosity, it is contemplated that by use of a suitable organic addition or diluent, the viscosity of the solution of a given glycol having a water content sufficiently low for dehydration of the gas, should be appreciably less than the viscosity of a dehydrating solution of the same amine, lacking the diluent. While the invention contemplates the use of any suitable hygroscopic polyhydric alcohol or glycol capable of regeneration by vaporization of its absorbed moisture, diethylene glycol may be regarded as typical.

As a result of the solution viscosity reduction, and the presence of the diluent in dissolved condition in the water-glycol solution, it is made possible to achieve increased efficiency in several respects including more efficient contact of the absorbent solution with the gas being treated, higher heat transfer rates being the lean and rich solutions being transferred between the contacting and heating zones, lower regeneration temperatures in the still or heating zone, and more complete regeneration despite the lower still temperature.

We have found that these effects and viscosity reduction of the glycol solution are attainable by the addition of a liquid diluent of lower viscosity than the glycol and compatible with or soluble in the glycol solution. Preferably we employ one or a mixture of compounds having a boiling temperature above about 190° C., and of the following alcohol and alcohol derivative class: Monohydric alcohols of lower viscosity than the corresponding polyhydric alcohols; substituted monohydric aliphatic alcohols, e. g., having a benzene ring in their structure, such as benzyl alcohol and phenyl ethyl alcohols; aromatic and alicyclic monohydric alcohols, such as homologues of cyclohexanol; heterocyclic, monohydric alcohols such as homologues of tetrahydrofurfuryl alcohol; water soluble monoethers of polyhydric alcohols such as carbitols, and cellosolves, particularly butyl carbitol, butyl cellosolve and phenyl cellosolve; and water soluble multiple ethers of polyhydric alcohols such as dimethoxytetraglycol. Of these compounds, butyl carbitol, phenyl cellosolve and benzyl alcohol are particularly effective in the glycol solution.

The proportions of glycol and diluent in the solution may vary in accordance with the requirements of a particular plant, the nature and water content of the wet gas, and the particular diluent selected. Generally speaking the diluent will be used in sufficient quantity to substantially reduce the solution viscosity, while leaving it adequately moisture absorptive, as may be the case at fairly high concentrations of the diluent, and particularly those which are themselves more hygroscopic. As a further advantage with respect to the contactor operation, it is contemplated that with the added diluent, the glycol solution may be regenerated to lower than ordinary water content, thus permitting the gas to be dehydrated to lower dew point without requiring appreciably higher still temperatures.

We claim:

1. The method of dehydrating a gas that includes contacting the gas with an aqueous solution of a glycol containing a substantial quantity of a dissolved non-aqueous organic liquid diluent itself soluble in and having less viscosity than the glycol and of the group consisting of monohydric alcohols, substituted monohydric aliphatic alcohols, aromatic and alicyclic monohydric alcohols, heterocyclic monohydric alcohols, water soluble monoethers of polyhydric alcohols, and water soluble multiple ethers of polyhydric alcohols, said diluent having a boiling temperature in excess of 190° C., and heating and regenerating the solution by vaporizing the absorbed moisture.

2. The method of dehydrating a gas that includes contacting the gas with an aqueous solution of diethylene glycol containing a substantial quantity of a dissolved different non-aqueous organic liquid diluent itself soluble in and having less viscosity than the glycol and of the group consisting of monohydric alcohols, substituted monohydric aliphatic alcohols, aromatic and alicyclic monohydric alcohols, heterocyclic monohydric alcohols, water soluble monoethers of polyhydric alcohols and water soluble multiple ethers of polyhydric alcohols, said diluent having a boiling temperature in excess of 190° C., and heating and regenerating the solution by vaporizing the absorbed moisture.

HENRY D. FRAZIER.
FRED C. RIESENFELD.

REFERENCES CITED

The following references are of record in the file of this patent:

UNITED STATES PATENTS

| Number | Name | Date |
|---|---|---|
| 2,091,983 | Heath et al. | Sept. 7, 1937 |
| 2,235,322 | Martin | Mar. 18, 1941 |
| 2,555,528 | Angelery | June 5, 1951 |